(12) United States Patent
Lim et al.

(10) Patent No.: US 12,304,363 B2
(45) Date of Patent: May 20, 2025

(54) VEHICLE REAR-SEAT POSITION ADJUSTMENT APPARATUS

(71) Applicants: Hyundai Motor Company, Seoul (KR); Kia Corporation, Seoul (KR)

(72) Inventors: Deok Soo Lim, Gyeonggi-do (KR); Sang Do Park, Gyeonggi-do (KR); Sang Soo Lee, Gyeonggi-do (KR); Jun Hwan Lee, Seoul (KR); Dong Hoon Keum, Busan (KR); Chan Ho Jung, Gyeonggi-do (KR); Sang Hark Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 366 days.

(21) Appl. No.: 17/939,589

(22) Filed: Sep. 7, 2022

(65) Prior Publication Data

US 2023/0073385 A1 Mar. 9, 2023

(30) Foreign Application Priority Data

Sep. 7, 2021 (KR) .......................... 10-2021-0118729

(51) Int. Cl.
*B60N 2/30* (2006.01)
*B60N 2/10* (2006.01)
*B60N 2/32* (2006.01)

(52) U.S. Cl.
CPC ............. *B60N 2/10* (2013.01); *B60N 2/3081* (2013.01); *B60N 2/3088* (2013.01); *B60N 2/3043* (2013.01); *B60N 2/305* (2013.01)

(58) Field of Classification Search
CPC .... B60N 2/304; B60N 2/3043; B60N 2/3045; B60N 2/305; B60N 2/3081; B60N 2/3088
USPC ......................................... 297/108, 110, 111
See application file for complete search history.

(56) References Cited

U.S. PATENT DOCUMENTS 2,650,644 A * 9/1953 Malco .................... A47C 1/031
297/108 X
5,358,306 A * 10/1994 Christensen ......... A47C 19/205
297/111 X
5,702,145 A * 12/1997 Fowler ................. B60N 2/3093
296/68.1

(Continued)

FOREIGN PATENT DOCUMENTS

EP 0324503 A2 * 7/1989 ........... B60N 2/3081
JP 2004-196001 A 7/2004

(Continued)

*Primary Examiner* — Rodney B White
(74) *Attorney, Agent, or Firm* — Fox Rothschild LLP

(57) ABSTRACT

Disclosed is a vehicle rear-seat position adjustment apparatus including a pair of support frames mounted on a floor panel in such a manner as to be spaced apart; a leg frame having a structure where a slot of a predetermined length is formed and fixedly mounted on the support frame; a tilting link of which a front end portion is connected to a slot in the leg frame in a manner that is movable backward and forward; a seat cushion frame of which a front end portion is connected to the leg frame and of which a rear end portion is connected to a rear end portion of the tilting link; a recliner mounted on a side frame connected to a rear end portion of the support frame; and a drive device connected to the front end portion of the tilting link and configured to move the tilting link backward and forward.

19 Claims, 11 Drawing Sheets

(56) References Cited

U.S. PATENT DOCUMENTS

| | | | | |
|---|---|---|---|---|
| 5,954,398 A * | 9/1999 | Namba | B60N 2/305 | 297/378.12 |
| 6,010,190 A * | 1/2000 | Downey | B60N 2/123 | 297/331 |
| 6,030,038 A * | 2/2000 | Namba | B60N 2/3013 | 297/378.12 |
| 6,158,799 A * | 12/2000 | Guilford | B60N 2/10 | 296/65.09 |
| 6,183,033 B1 * | 2/2001 | Arai | B60N 2/36 | 297/331 X |
| 6,196,613 B1 * | 3/2001 | Arai | B60N 2/366 | 297/335 X |
| 6,237,981 B1 | 5/2001 | Selleck | | |
| 6,499,787 B2 * | 12/2002 | Jach | B60N 2/309 | 297/336 X |
| 6,568,736 B2 * | 5/2003 | Jach | B60N 2/305 | 297/336 X |
| 6,595,587 B2 * | 7/2003 | Konishi | B60R 22/26 | 297/331 X |
| 6,598,926 B1 * | 7/2003 | Price | B60N 2/06 | 297/335 X |
| 6,655,738 B2 * | 12/2003 | Kammerer | B60N 2/0292 | 297/331 X |
| 6,666,512 B1 * | 12/2003 | Timon | B60N 2/3013 | 297/335 X |
| 6,705,658 B2 * | 3/2004 | Jach | B60N 2/1615 | 296/65.09 |
| 6,811,200 B2 * | 11/2004 | Shibata | B60N 2/01 | 296/65.09 |
| 6,817,646 B2 * | 11/2004 | Kikuchi | B60N 2/06 | 296/65.09 |
| 6,820,911 B2 * | 11/2004 | Furui | B60N 2/3075 | 296/65.09 |
| 6,820,913 B2 * | 11/2004 | Macey | B60N 2/10 | 296/65.01 |
| 7,281,760 B2 * | 10/2007 | Braitmaier | B60N 2/22 | 297/111 |
| 7,413,251 B2 * | 8/2008 | Link | B60N 2/0705 | 297/334 X |
| 7,559,602 B2 | 7/2009 | Ward et al. | | |
| 7,686,368 B2 * | 3/2010 | Ghergheli | B60N 2/206 | 296/65.09 |
| 8,393,677 B2 * | 3/2013 | Wieclawski | B60N 2/3059 | 297/235 |
| 8,573,670 B2 * | 11/2013 | Zekavica | B60N 2/3031 | 297/188.04 |
| 9,469,349 B1 * | 10/2016 | Mather | B62D 25/20 | |
| 10,173,556 B2 * | 1/2019 | Imayou | B60N 2/06 | |
| 10,189,373 B2 * | 1/2019 | Thomas | B60N 2/01 | |
| 10,471,859 B2 | 11/2019 | Harrison, III et al. | | |
| 11,117,499 B2 * | 9/2021 | Mori | B60N 2/3011 | |
| 11,772,519 B2 * | 10/2023 | Kondrad | B60N 2/02 | 296/64 |
| 11,897,370 B2 * | 2/2024 | Line | B60N 2/3043 | |
| 11,904,732 B2 * | 2/2024 | Kondrad | B60N 2/143 | |
| 12,077,068 B2 * | 9/2024 | Kondrad | B60N 2/06 | |
| 2002/0043850 A1 * | 4/2002 | Sugimoto | B60N 2/3011 | 297/344.1 |
| 2005/0253438 A1 * | 11/2005 | Lee | B60N 2/305 | 297/378.1 |
| 2006/0006702 A1 | 1/2006 | Starna | | |
| 2008/0197683 A1 * | 8/2008 | Ebbeskotte | B60N 2/3013 | 297/335 |
| 2013/0140863 A1 * | 6/2013 | Wieclawski | B60N 2/3086 | 297/236 |
| 2014/0077536 A1 * | 3/2014 | Mather | B60N 2/3031 | 297/313 |
| 2018/0265010 A1 * | 9/2018 | Line | B60N 2/22 | |
| 2018/0265011 A1 * | 9/2018 | Salenbien | B60R 7/043 | |
| 2018/0297533 A1 * | 10/2018 | Mozurkewich | B60N 2/3013 | |

FOREIGN PATENT DOCUMENTS

| | | |
|---|---|---|
| JP | 2013-112010 A | 6/2013 |
| JP | 2020-026169 A | 2/2020 |

* cited by examiner

[ CROSS SECTION TAKEN ALONG LINE A-A ]

[ CROSS SECTION TAKEN ALONG LINE B-B ]

VEHICLE REAR-SEAT POSITION ADJUSTMENT APPARATUS

CROSS REFERENCE TO RELATED APPLICATION

The present application is based on and claims under 35 U.S.C. § 119 (a) the benefit of Korean Patent Application No. 10-2021-0118729, filed Sep. 7, 2021, the entire contents of which is incorporated herein for all purposes by this reference.

TECHNICAL FIELD

Embodiments of the present disclosure relate to a vehicle rear-seat position adjustment apparatus and, more particularly, to a vehicle rear-seat position adjustment apparatus capable of adjusting rear seat positioning toward a vehicle rear end to provide a comfortable relaxed environment.

DESCRIPTION OF THE RELATED ART

Recent years have witnessed an increase in the number of people choosing auto-camping for various outdoor leisure activities. Tailgating activities are conducted using a vehicle rear seat and a tailgate in outdoor environments, such as auto-camping sites.

For example, in a state where a tailgate of a vehicle is opened, a tarp, tent, or the like may be connected to the tailgate in order to provide a space for holding a party. Furthermore, a seat back of a rear seat of the vehicle may be pushed toward the vehicle rear end in order to provide a space for an occupant to take a rest while lying. Alternatively, the seat back thereof may be pushed in order for the occupant to sit on the seat back of the pushed rear seat with his/her back being supported on the seat back of a front seat of the vehicle in a comfortable relaxed manner while viewing the scenery through the tailgate opened or while watching a movie on a screen attached to the vicinity of the tailgate. In this manner, the rear seat can be utilized as a useful convenience for various tailgating activities.

FIG. 1 is a schematic view illustrating a state where the occupant sits on a seat back of an existing rear seat that is pushed toward the vehicle rear end.

With reference to FIG. 1, a seat back 12 of a rear seat 10 in the second and the third row is pushed toward a vehicle front end, and thus lies on a flat surface, and the seat back 22 of a front seat 20 is reclined toward a vehicle front end. In this state, the occupant may sit on the seat back 12 of the rear seat 10, pushed down to the flat surface, with his/her back being supported on the seat back 22 of the front seat 20, while viewing the scenery through the tailgate opened in a comfortable relaxed manner or while watching a movie on a screen attached to the vicinity of the tailgate.

However, because the seat back 12 of the rear seat is formed of a solid material suitable for loading luggage and has a structure of a flat plate, a rear surface of the seat back 12 is all flat without being partly inclined. Thus, when the occupant sits on the rear surface of the seat back 12, his/her buttocks are gradually pushed toward the vehicle rear end in a sliding manner. Thus, the occupant cannot feel comfortable and relaxed.

That is, in a state where the occupant sits on the seat back 12 of the rear seat 10, pushed down to the flat surface, with his/her back being supported on the seat back 22 of the front seat 20, his/her buttocks and thighs are not held in place and thus are pushed in a sliding manner toward the vehicle rear end. Thus, the occupant cannot feel comfortable and relaxed.

SUMMARY

An objective of embodiments of the present disclosure is to provide a vehicle rear-seat position adjustment apparatus capable of positioning a rear seat in order to provide a comfortable relaxed environment. This positioning is performed through the following operations. A seat back of the rear seat is reclined in such a manner as to come into close contact with the bottom of a luggage room behind. Furthermore, in order to be tilted, a rear end portion of a seat cushion of the rear seat is raised in such a manner that the seat cushion of the rear seat is inclined upward toward a vehicle rear end. In the vehicle rear-seat position adjustment apparatus, an occupant can sit on the seat cushion of the rear seat with his/her back being supported on the seat back of a front seat. In this manner, while supported on the seat back of the rear seat, the occupant can feel comfortable and relaxed in the same manner as if a leg rest were used.

According to an embodiment of the present disclosure, there is provided a vehicle rear-seat position adjustment apparatus including: a pair of support frames mounted on a floor panel in such a manner as to be spaced apart from each other in a leftward-rightward direction; a leg frame having a structure in which a slot of a predetermined length is formed and fixedly mounted on the support frame; a tilting link of which a front end portion is connected to a slot in the leg frame in a manner that is movable backward and forward; a seat cushion frame of which a front end portion is connected by a hinge mechanism to the leg frame and of which a rear end portion is connected by the hinge mechanism to a rear end portion of the tilting link; a recliner mounted on a side frame connected to a rear end portion of the support frame in order to recline a seat back of a rear seat; and a drive device connected to the front end portion of the tilting link and configured to move the tilting link backward and forward along the slot.

In the vehicle rear-seat position adjustment apparatus, when with a drive force by the drive device, the front end portion of the tilting link moves backward along the slot, an operation of vertically raising the tilting link and at the same time causing the rear end portion of the tilting link to push upward the rear end portion of the seat cushion frame may be performed. As referred to herein, a tilting link may be pivotal along at least one end or axis. A preferred tilting link may be suitably operable in at least a first holding position, and a second releasing position and optionally third or more releasing positions.

In the vehicle rear-seat position adjustment apparatus, the drive device may include: a motor mounted on the seat cushion frame; a decelerator connected to an output shaft of the motor; a lead screw of which a first end portion is connected to an output shaft of the decelerator and of which a second end portion is connected to a bracket mounted on a rear end portion of the leg frame in a manner that is rotatable in a stationary position; and a slider combined by a nut and bolt mechanism to the lead screw and connected to the front end portion of the tilting link, the slider thus moving backward or forward when the lead screw rotates in the stationary position.

In the vehicle rear-seat position adjustment apparatus, the drive device may include: an electrically powered cylinder or a hydraulic pressure cylinder that is mounted on the leg frame; and a piston rod mounted on the electrically powered cylinder or the hydraulic pressure cylinder in a manner that is movable backward and forward and thus connected by the hinge mechanism to the front end portion of the tilting link.

According to another embodiment of the present disclosure, there is provided a vehicle rear-seat position adjustment apparatus including: a pair of fixation rails mounted on a floor panel in such a manner as to be spaced apart from each other in a leftward-rightward direction; a movable rail fastened to the fixation rail in a manner that is movable backward and forward; a leg frame having a structure in which a slot of a predetermined length is formed and fixedly mounted on the fixation rail; a tilting link of which a front end portion is connected to a slot in the leg frame in a manner that is movable backward and forward, and is connected by a hinge mechanism to the movable rail; a seat cushion frame of which a front end portion is connected by the hinge mechanism to the leg frame and of which arear end portion is connected by the hinge mechanism to a rear end portion of the tilting link; a recliner mounted on a side frame in order to recline a seat back of a rear seat; and a manual operation mechanism connected to the movable rail in a lockable-enabled manner and configured to move backward and forward the front end portion of the tilting link fastened by the hinge mechanism to the movable rail.

In the vehicle rear-seat position adjustment apparatus, when with a drive force by the manual operation mechanism, the front end portion of the tilting link moves backward along the slot, an operation of vertically raising the tilting link and at the same time causing the rear end portion of the tilting link to push upward the rear end portion of the seat cushion frame may be performed.

In the vehicle rear-seat position adjustment apparatus, the manual operation mechanism may include: a hinge bracket mounted on the movable rail; a clasp rotatably mounted on the hinge bracket and selectively inserted into one of a plurality of locking holes, formed in the fixation rail, for being locked thereto; and a manual operation bar of a predetermined length connected to the clasp and operating to rotate the clasp in a locking or unlocking direction.

According to still another embodiment of the present disclosure, there is provided a vehicle rear-seat position adjustment apparatus including: a pair of support frames mounted on a floor panel in such a manner as to be spaced apart from each other in a leftward-rightward direction; a leg frame having a structure in which a slot of a predetermined length is formed and fixedly mounted on the support frame; a tilting link of which a front end portion is connected to a slot in the leg frame in a manner that is movable backward and forward; a seat cushion frame of which a front end portion is connected by a hinge mechanism to the leg frame and of which a rear end portion is connected by the hinge mechanism to a rear end portion of the tilting link; a recliner mounted on a side frame connected to a rear end portion of the support frame in order to recline a seat back of a rear seat; and a locking device mounted between the leg frame and the tilting link and configured to fix the tilting link when the front end portion of the tilting link reaches the frontmost moving point or the rearmost moving point in the slot.

In the vehicle rear-seat position adjustment apparatus, the locking device may include: a first latch mounted on a front end portion of the leg frame; a second latch mounted on a rear end portion of the led frame; a first striker mounted on a front end portion of the tilting link and fastened to the first latch for being locked thereto when the front end portion of the tilting link reaches the frontmost moving point in the slot; and a second striker mounted on the front end portion of the tilting link and fastened to the second latch for being locked thereto when the front end portion of the tilting link reaches the rearmost moving point in the slot.

In the vehicle rear-seat position adjustment apparatus, an unlocking cable connected to each of the first latch and the second latch may be connected to one unlocking lever in a manner that is enabled to be pulled together.

In the vehicle rear-seat position adjustment apparatus, a guide pin inserted into the slot for being fastened thereto in a manner that is movable backward or forward may be formed on the front end portion of the tilting link.

In the vehicle rear-seat position adjustment apparatus, the seat cushion frame may be covered by a seat cushion of the rear seat and may include: a first connection pipe connected to front end portions of the leg frames and thus arranged along the leftward-rightward direction; a tilting frame of which a front end portion is connected by the hinge mechanism to the first connection pipe and of which a rear end portion is connected by the hinge mechanism to the rear end portion of the tilting link, the tilting frame thus being arranged along the forward-backward direction; and a second connection pipe connected to the rear end portions of the tilting frames and thus arranged along the leftward-rightward direction.

In the vehicle rear-seat position adjustment apparatus, a latch may be mounted on a rear surface of the seat back of the rear seat, and a striker fastened to the latch in a locking-enabled manner may be mounted on a bottom of a luggage room.

The vehicle rear-seat position adjustment apparatus according to embodiments of the present disclosure provides the following advantages.

Firstly, the rear seat can be positioned to provide a comfortable relaxed environment through a tilting operation of pushing the seat back of the rear seat toward a vehicle rear end down to a luggage room and raising the rear end portion of the seat cushion of the rear seat. Thus, an occupant can feel comfortable and relaxed using proper body, with the vehicle rear end in his/her line of sight.

Secondly, the occupant can place his/her buttocks on the seat cushion of the rear seat with his/her back being supported on the seat back of the front seat and can place his/her calves on the seat back of the rear seat in the same manner as if a leg rest were used. In this manner, the seat can be positioned to provide a fatigue-reducing environment in such a manner that the occupant can take a rest.

Thirdly, when the occupant sits on the seat cushion of the rear seat, the rear end portion of the seat cushion of the rear seat is raised. In this state, the occupant's buttocks can be prevented from being pushed toward the vehicle rear end in a sliding manner. Thus, the occupant can feel comfortable and relaxed while maintaining proper body posture for taking a rest, viewing the scenery through a tailgate opened, watching a movie on a screen attached to the vicinity of the tailgate, and the like. In this manner, the rear seat can be utilized as a useful convenience for various tailgating activities.

In another aspect, vehicles are provided that comprise an apparatus as disclosed herein.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION

Figure 1:
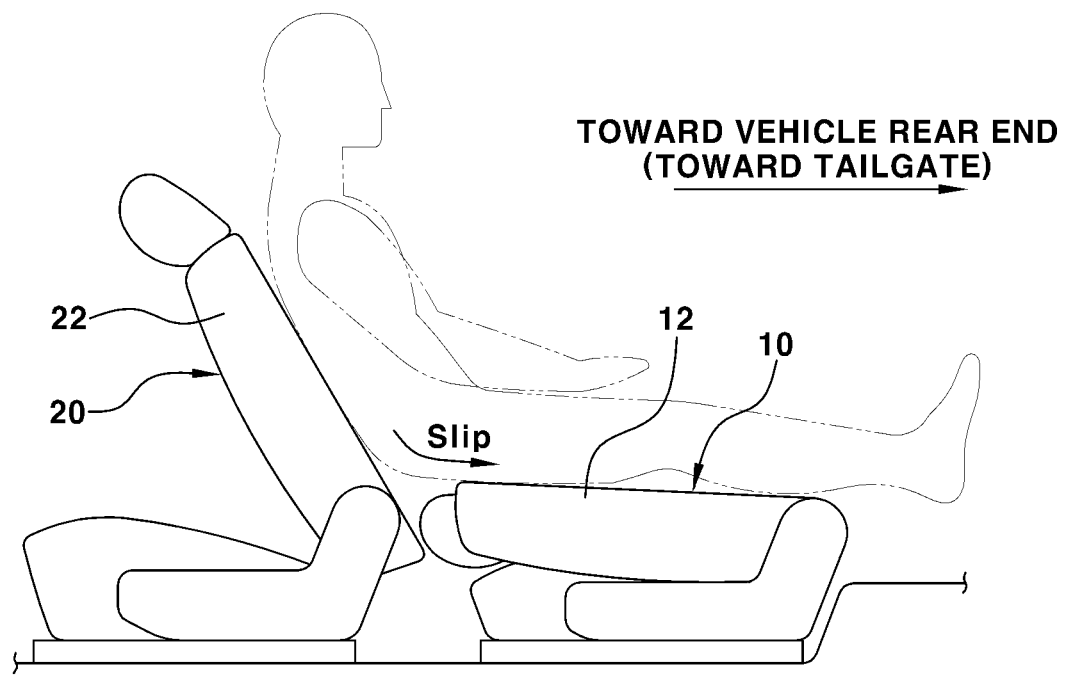
FIG. 1 is a schematic view illustrating a state where an occupant sits on a seat back of an existing rear seat that is pushed toward a vehicle rear end.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Figure 2:
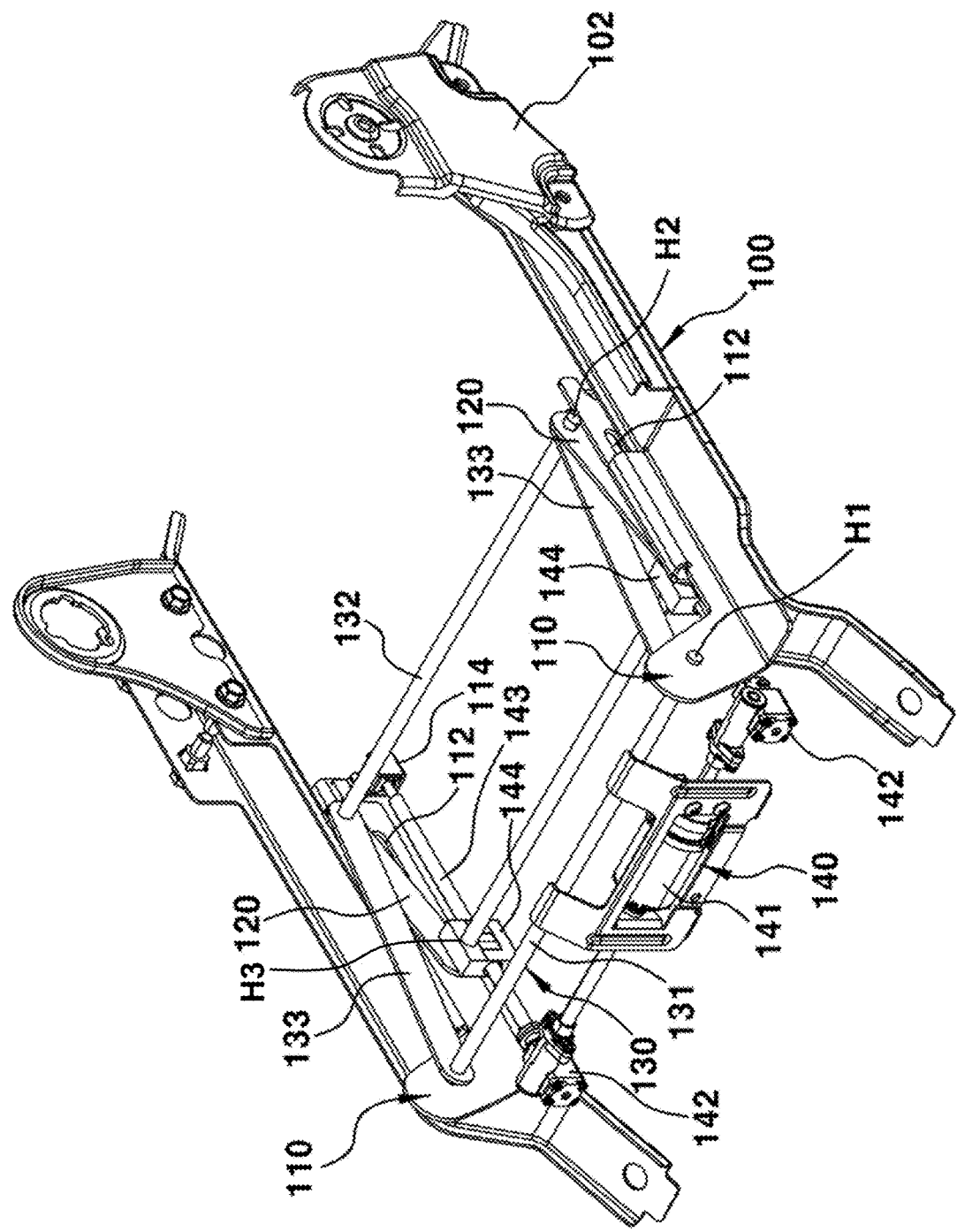
FIGS. 2 and 3 are perspective views illustrating pre-operation and post-operation states, respectively, of a vehicle rear-seat position adjustment apparatus according to a first embodiment of the present disclosure.
Figure 3:
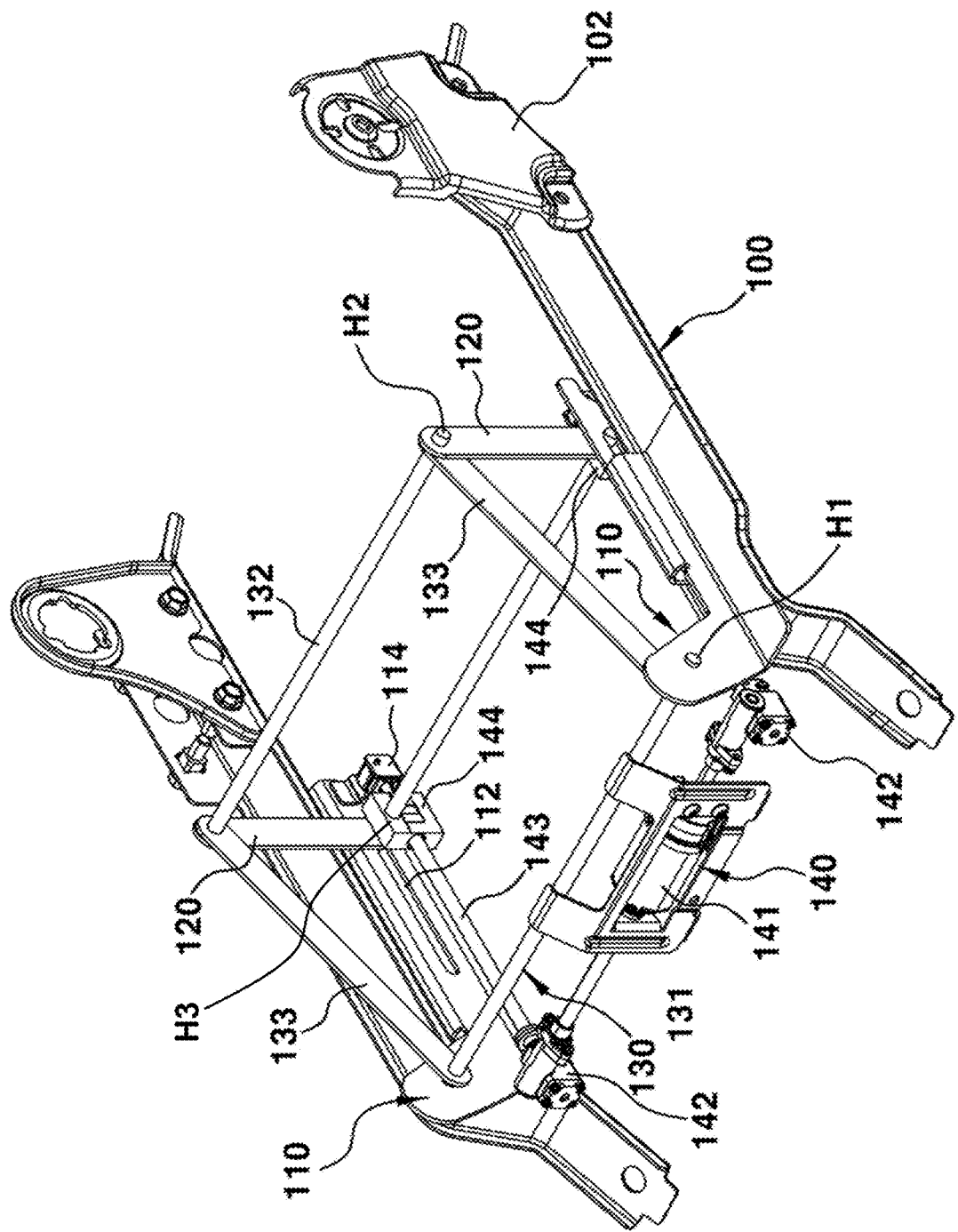
Figure 4:
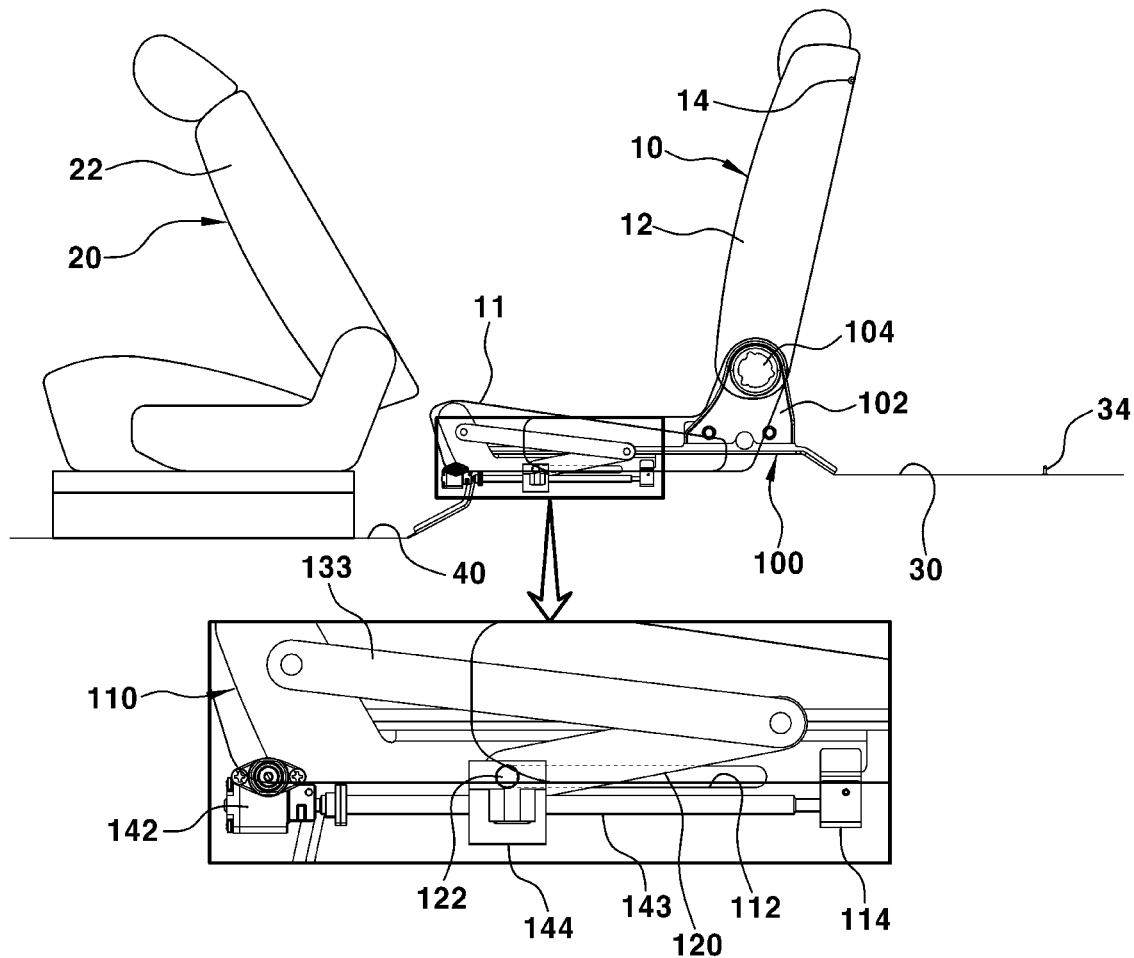
FIGS. 4 and 5 are longitudinal cross-sectional views illustrating the pre-operation and post-operation states, respectively, of the vehicle rear-seat position adjustment apparatus according to the first embodiment of the present disclosure.
Figure 5:
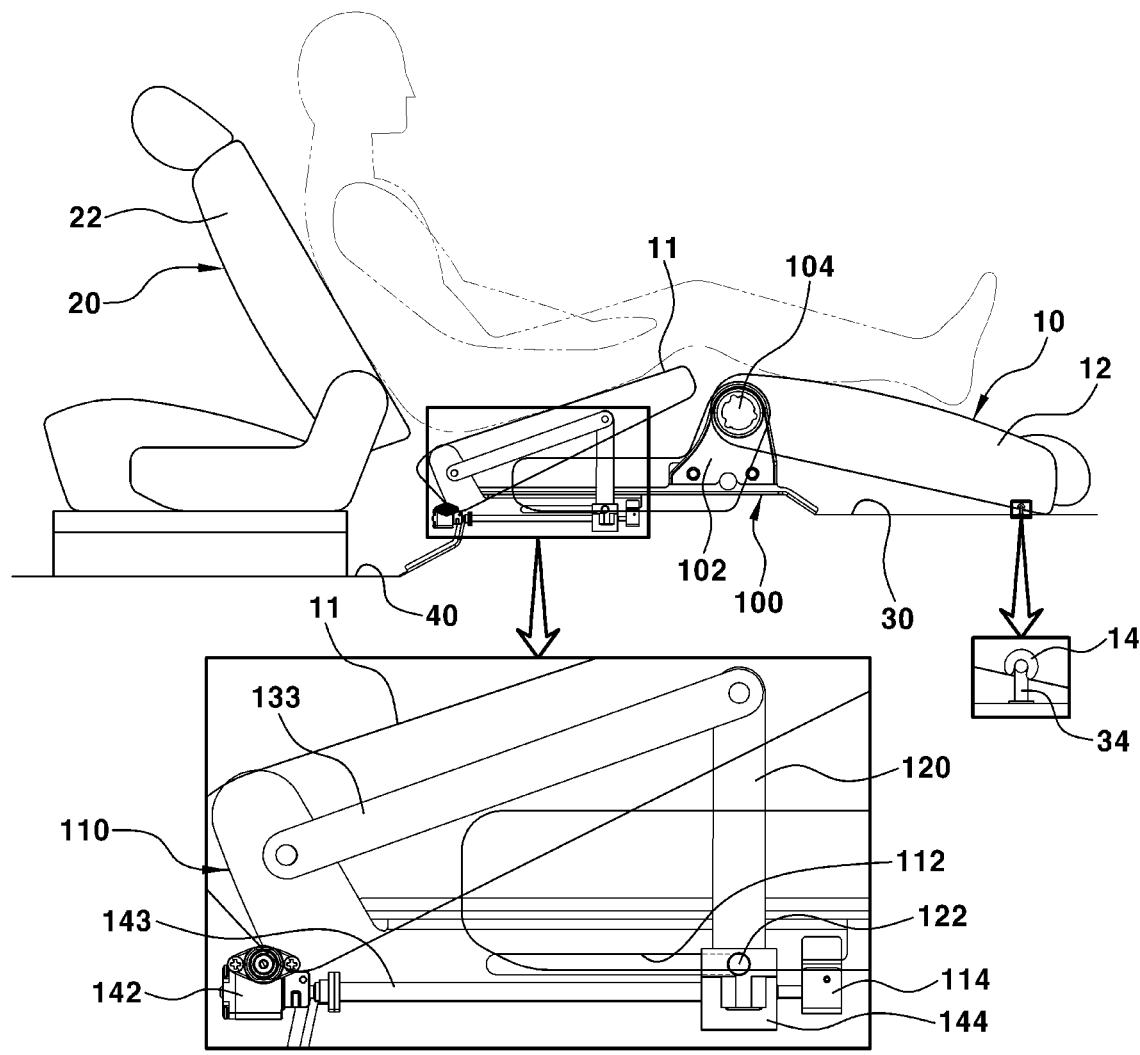

FIGS. 2 and 3 are perspective views illustrating pre-operation and post-operation states, respectively, of a vehicle rear-seat position adjustment apparatus according to a first embodiment of the present disclosure. FIGS. 4 and 5 are longitudinal cross-sectional views illustrating the pre-operation and post-operation states, respectively, of the vehicle rear-seat position adjustment apparatus according to the first embodiment of the present disclosure.

As illustrated in FIGS. 2 to 4, a pair of support frames 100 in the shape of a long plate may be spaced apart a predetermined distance along a forward-backward direction (vehicle width direction) from each other and may be mounted on a floor panel 40. A leg frame 110 may be mounted on each support frame 100 and may be kept fixed thereon. The leg frame 110 may support a seat cushion of a rear seat and, at the same time, serve to limit a mounting position of the seat cushion.

The leg frame 110 may have a structure of a vertical plate in which a slot 112 of a predetermined great length in the forward-backward direction is formed. An outer lateral side of the leg frame 110 may be mounted on each support frame 100.

In addition, a front end portion of a tilting link 120 may be connected to a slot 112 in the leg frame 110 in a manner that is movable backward and forward. To this end, a guide pin 122 may be formed on the front end portion of the tilting link 120. The guide pin 122 may be inserted into the slot 112 for being fastened thereto in a manner that is movable backward or forward.

Accordingly, as the guide pin 122 moves backward or forward along the slot 112, the front end portion of the tilting link 120 on which the guide pin 122 is formed may move backward or forward.

At this time, a front end portion of a seat cushion frame 130, which is an internal bone structure of the seat cushion of the rear seat, may be rotatably connected by a first hinge mechanism H1 to a front end portion of the leg frame 110. A rear end portion of the seat cushion frame 130 may be rotatably connected by a second hinge mechanism H2 to a rear end portion of the tilting link 120.

Desirably, in order to maintain its strength, the seat cushion frame 130, as the internal bone structure covered by the seat cushion of the rear seat, may be configured to include a first connection pipe 131, a tilting frame 133, and a second connection pipe 132. The first connection pipe 131 may be connected to the front end portions of the leg frames 110 and thus may be arranged along the leftward-rightward direction. A front end portion of the tilting frame 133 may be rotatably connected by the first hinge mechanism H1 to the first connection pipe 131, and a rear end portion thereof may be rotatably connected by the second hinge mechanism H2 to the rear end portion of the tilting link 120. Thus, the tilting frame 133 may be arranged along the forward-backward direction. The second connection pipe 132 may be connected to the rear end portions of the tilting frames 133 and thus may be arranged along the leftward-rightward direction.

Accordingly, when the guide pin 122 on the tilting link 120 is positioned at the frontmost position in the slot 112 in the leg frame 110, the tilting link 120 may be inclined upward toward a backward direction inside the leg frame 110 and thus may be in a state of being arranged along the forward-backward direction, and the tilting frame 133 of the seat cushion frame 130 may be inclined downward toward the backward direction and thus may be in the stage of being arranged along the forward-backward direction.

In contrast, when the guide pin 122 on the tilting link 120 is positioned at the rearmost position in the slot 112 in the leg frame 110, the tiling link 120 may be vertically raised and thus pushes upward the rear end portion of the seat cushion frame 130, that is, the rear end portion of the tilting frame 133 of the seat cushion frame 130. Accordingly, the tilting frame 133 may be inclined upward toward the backward direction and thus may be arranged in the state of being along the forward-backward direction.

To this end, a drive device 140 may be connected to the front end portion of the tilting link 120. The drive device 140 may serve to pull the tilting link 120 toward the frontmost position in the slot 112 and thus to move the tilting link 120 forward. The drive device 140 may serve to push the tilting link 120 toward the rearmost position in the slot 112 and thus to move the tilting link 120 backward.

The drive device 140 may be configured to include a motor 141, a decelerator 142, a lead screw 143, and a slider 144. With a bracket, the motor 141 may be mounted on the first connection pipe 131 of the seat cushion frame 130. The decelerator 142 may be connected to an output shaft of the motor 141. The lead screw 143 may be connected to an output shaft of the decelerator 142 in a manner that is rotatable in a stationary position. The slider 144 may be combined by a nut and bolt mechanism with the lead screw 143 in a manner that is movable backward and forward.

In this case, a first end portion of the lead screw 143 that constitutes the drive device 140 may be connected to the output shaft of the decelerator 142, and a second end portion thereof may be connected to a bracket 114 mounted on a rear end portion of the leg frame 110 in a manner that is rotatable in a stationary position.

In addition, the slider 144 that constitutes the drive device 140 may be combined by the nut and bolt mechanism with the lead screw 143, and an outer flank surface of the slider 144 may be connected by a third hinge mechanism H3 to the front end portion of the tilting link 120.

More specifically, an outer flank surface of the slider 144 may be connected by the third hinge mechanism H3 to the front end portion of the tilting link 120 on which the guide pin 122 is formed. Thus, as the slider 144 moves backward and forward, the guide pin 122 on the tilting link 120 may move backward and forward along the slot 112 in the leg frame 110.

A side frame 102 may be mounted on a rear end portion of the support frame 100. As illustrated in FIGS. 4 and 5, a recliner 104 may be mounted on the side frame 102. The recliner 104 may serve to recline a seat back 12 of a rear seat 10 toward a vehicle rear end.

For reference, the recliner 104 may be provided as a mechanism that reclines the seat back toward the vehicle rear end when unlocking a reclining lever. The reclining mechanism of this recliner is well known to a person of ordinary skill in the art, and thus a detailed description thereof is omitted.

In addition, with reference to FIGS. 4 and 5, the latch 14 may be mounted on a rear surface of the seat back 12 of the rear seat 10, and a striker 34 may be mounted on a bottom of a luggage room 30. The striker 34 may be fastened to the latch 14 in a locking-enabled manner.

Accordingly, when the seat back 12 of the rear seat 10 is reclined backward down to the bottom of the luggage room 30, the striker 34 may be fastened to the latch 14 for being locked thereto. Thus, the seat back 12 may be kept fixed.

For reference, as the latch 14, a well-known latch or the like that is mounted on a vehicle door and is fastened to the striker for being locked thereto may be used. The locking structure of the latch, the operation principle of the latch, and the like are well known, and thus detailed descriptions thereof are omitted.

The flow of operation of the vehicle rear-seat position adjustment apparatus, configured as described above, according to the first embodiment of the present disclosure is described as follows.

As illustrated in FIG. 4, when the guide pin 122 on the tilting link 120 is positioned at the frontmost position in the slot 112 in the leg frame 110, a seat cushion 11 and the seat back 12 of the rear seat 10 may be kept positioned at their original positions, respectively, so that an occupant can sit on the seat cushion 11 with his/her back being supported on the seat back 12, with a vehicle front end in his/her line of sight.

More specifically, when the guide pin 122 on the tilting link 120 is positioned at the frontmost position in the slot 112 in the leg frame 110, the tilting link 120 may be inclined upward toward the backward direction and thus may be in the state of being arranged along the forward-backward direction. Furthermore, the tilting frame 133 of the seat cushion frame 130 may be inclined downward toward the backward direction and thus may be in the state of being arranged along the forward-backward direction. Thus, the seat cushion 11 and the seat back 12 of the rear seat 10 may be kept positioned at their original positions, respectively, so that the occupant can sit on the seat cushion 11 within his/her back being supported on the seat back 12, with the vehicle front end in his/her line of sight.

In a state where the rear seat 10 and the seat back 12 of the seat cushion 11 are arranged at their original positions, respectively, a tilting operation of pushing the seat back 12 of the rear seat 10 toward the vehicle rear end down to the luggage room 30 and raising a rear end portion of the seat cushion 11 of the rear seat 10 may be performed. Accordingly, the rear seat 10 may be positioned to provide a comfortable relaxed environment. Thus, the occupant can feel comfortable and relaxed using proper body posture, with the vehicle rear end in his/her line of sight.

To this end, when the motor 141 of the drive device 140 is driven for rotation in one direction, a rotational force of the motor 141 may be transferred to the lead screw 143 through the decelerator 142, and the lead screw 143 may rotate in a stationary position in one direction. Subsequently, the slider 144, as illustrated in FIG. 3, may move backward toward the vehicle rear end, and at the same time, the front end portion of the tilting link 120 fastened by the third hinge mechanism H3 to the slider 144 may also move backward together.

In addition, the guide pin 122 on the tilting link 120 may move backward along the slot 112 in the leg frame 110 and may be positioned at the rearmost position in the slot 112.

Particularly, when the guide pin 122 on the tilting link 120 is positioned at the rearmost position in the slot 112 in the leg frame 110, the tilting link 120 may be vertically raised and may push upward the rear end portion of the seat cushion frame 130, that is, the rear end portion of the tilting frame 133 of the seat cushion frame 130. Accordingly, the tilting frame 133 may be inclined upward toward the backward direction and thus may be in the state of being arranged along the forward-backward direction.

In addition, when the seat back 12 of the rear seat 10 is reclined toward the vehicle rear end down to the bottom of the luggage room 30, the striker 34 may be fastened to the latch 14 for being locked thereto. Thus, the seat back 12 may be kept fixed.

In this case, a seat back 22 of a front seat 20 may be reclined toward the vehicle front end in such a manner that the occupant can lean on the seat back 22.

Therefore, as illustrated in FIG. 5, the occupant can place his/her buttocks and thighs on the seat cushion 11 of the rear seat 10 with his/her back being supported on the seat back 22 of the front seat 20. Furthermore, the occupant can place his/her calves on the seat back 12 of the rear seat 10 in the same manner as if a leg rest were used. In this manner, the rear seat may be positioned to provide a fatigue-reducing environment. Thus, the occupant can feel comfortable and relaxed using fatigue-reducing body posture while viewing the scenery through a tailgate opened or while watching a movie on a screen attached to the vicinity of the tailgate.

Particularly, when the occupant sits on the seat cushion 11 of the rear seat 10, the rear end portion of the seat cushion 11 of the rear seat 10 may be in a state of being raised. Thus, the occupant's buttocks may be prevented from being pushed toward the vehicle rear end in a sliding manner. Therefore, the occupant can feel comfortable and relaxed while maintaining fatigue-reducing body posture for taking a rest, viewing the scenery through the tailgate opened, watching a movie on the screen attached to the vicinity of the tailgate, and the like. In this manner, the rear seat 10 can be utilized as a useful convenience for various tailgating activities.

As the drive device 140, an electrically powered cylinder or a hydraulic pressure cylinder 145 may be used instead of the motor 141, a decelerator 142, and the like.

Figure 6:
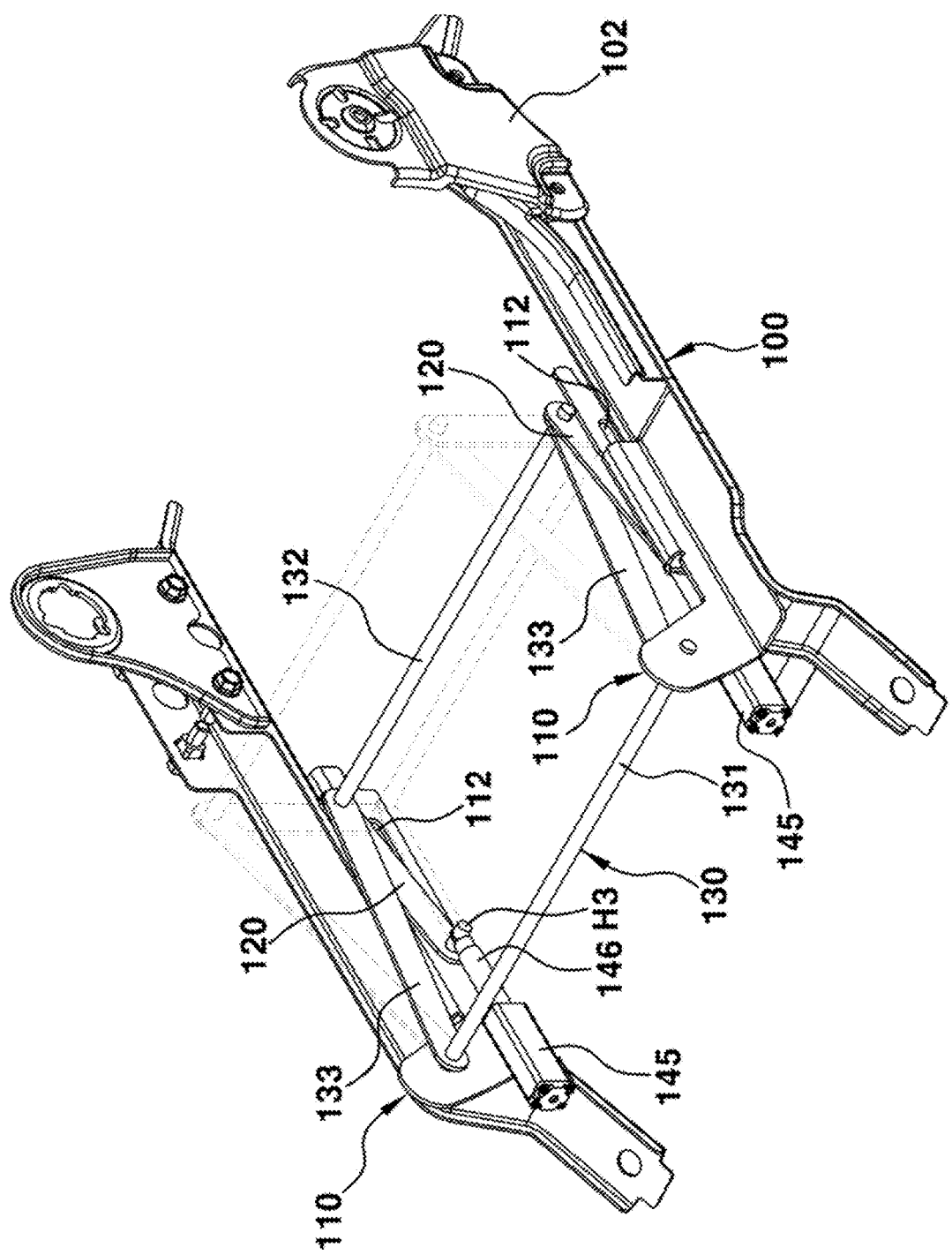
FIG. 6 is a perspective view illustrating an example where an electrically powered cylinder or a hydraulic pressure cylinder is configured as a drive device of the vehicle rear-seat position adjustment apparatus according to the first embodiment of the present disclosure.

More specifically, the drive device 140, as illustrated in FIG. 6, may be configured to include the electrically powered cylinder or the hydraulic pressure cylinder 145, and a piston rod 146. The electrically powered cylinder or the hydraulic pressure cylinder 145 may be mounted on the leg frame 110. The piston rod 146 may be mounted on the electrically powered cylinder or the hydraulic pressure cylinder 145 in a manner that is movable backward and forward and may be connected by the third hinge mechanism H3 to the front end portion of the tilting link 120.

Accordingly, as the electrically powered cylinder or the hydraulic pressure cylinder 145 is driven, the piston rod 146 may move backward, and thus pushes the front end portion of the tilting link 120 backward. Accordingly, as described above, operations, such as an operation of vertically raising the tilting link 120 and pushing upward the rear end portion of the tilting frame 133 of the seat cushion frame 130, may be consistently performed. Thus, the rear seat 10 may be consistently positioned to provide a fatigue-reducing environment.

Figure 7:
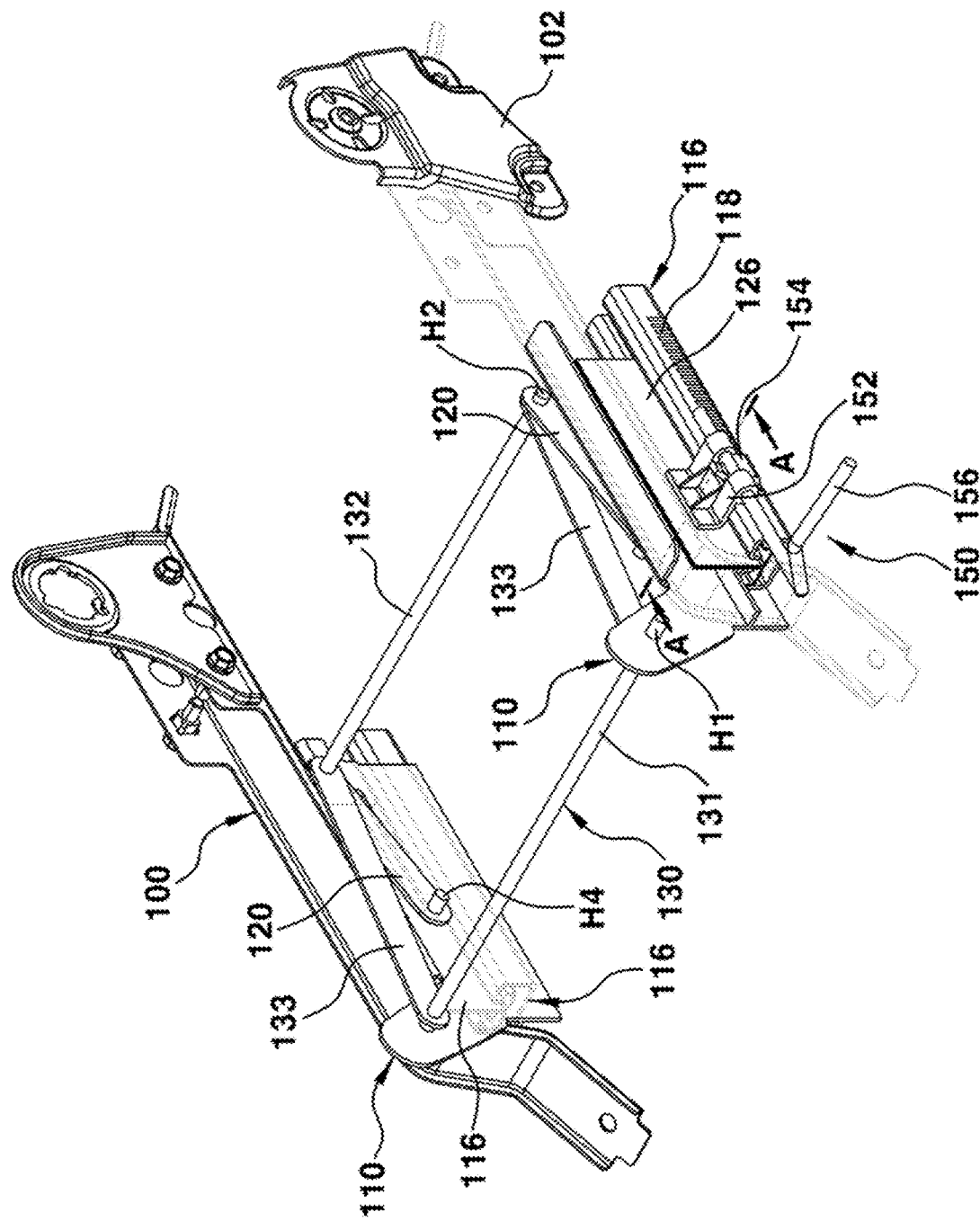
FIGS. 7 and 8 are perspective views illustrating pre-operation and post-operation states, respectively, of a vehicle rear-seat position adjustment apparatus according to a second embodiment of the present disclosure.
Figure 8:
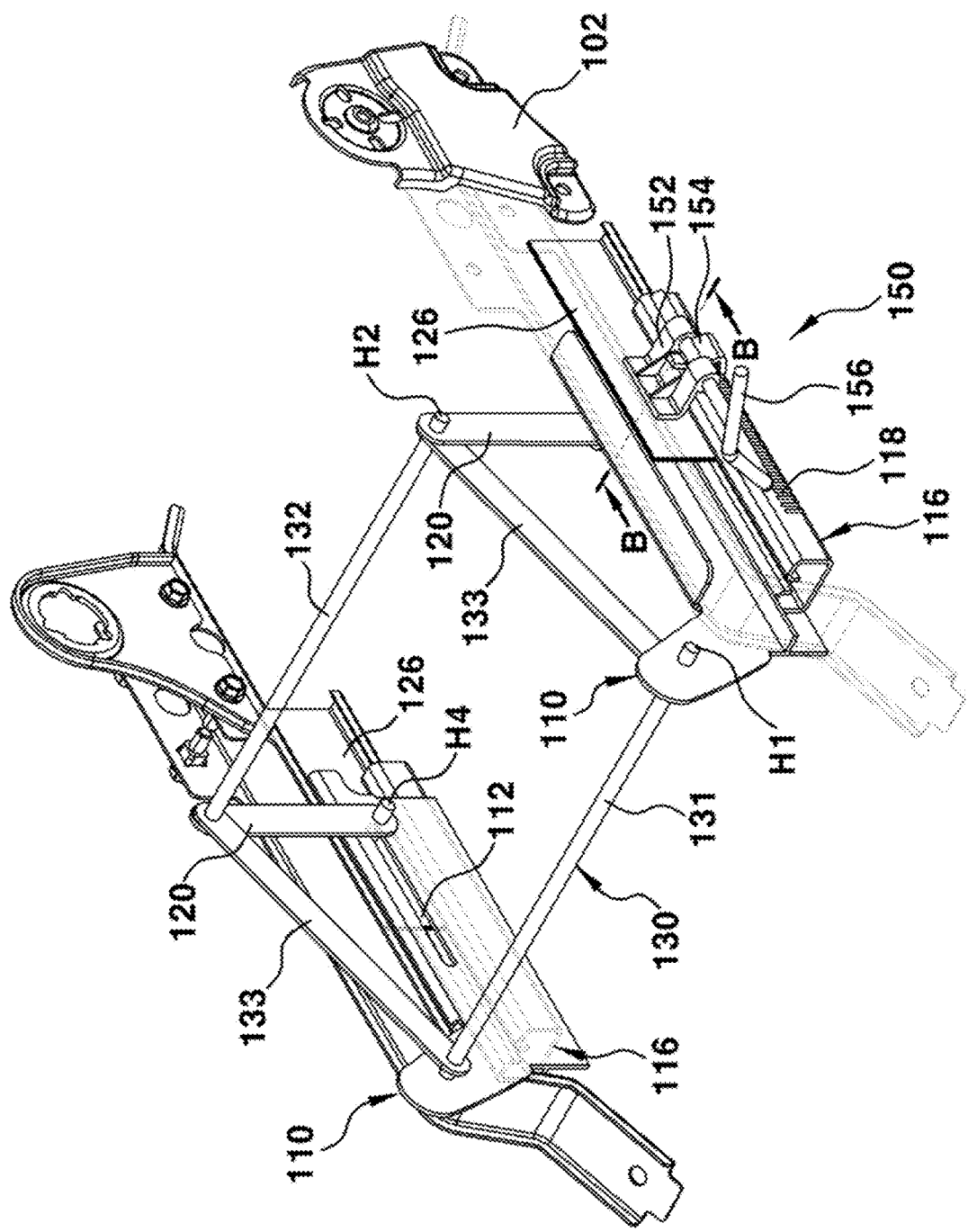
Figure 9:
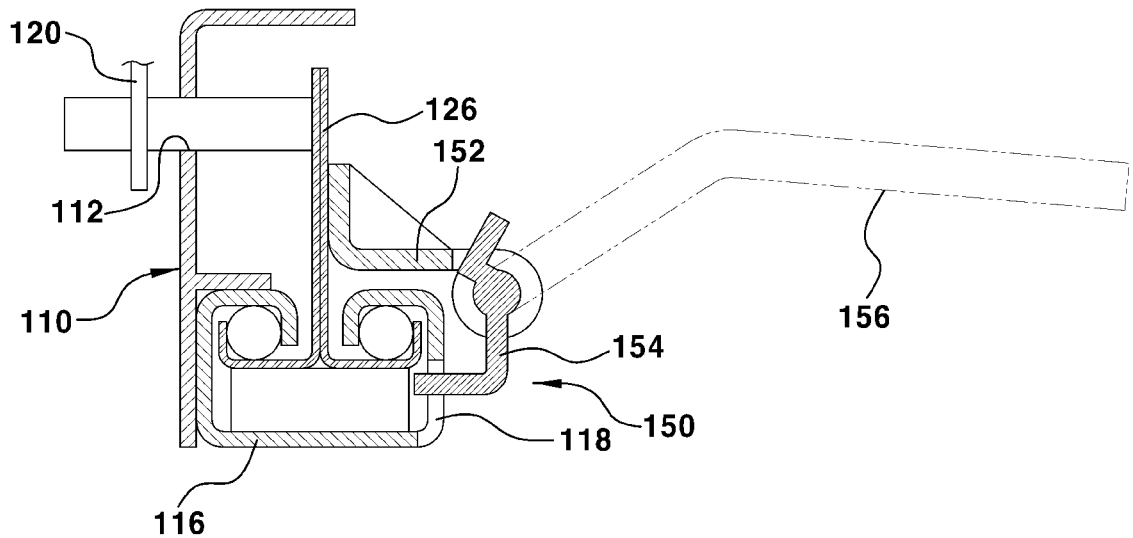
FIG. 9 is a cross-sectional view taken along line A-A on FIG. 7.
Figure 10:
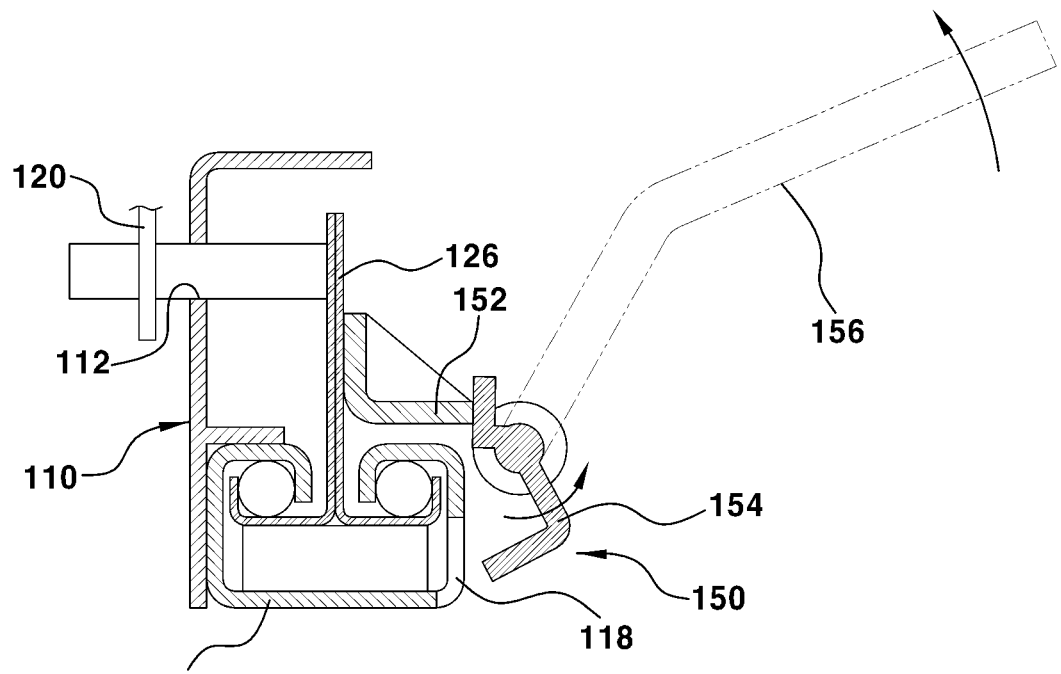
FIG. 10 is a cross-sectional view taken along line B-B on FIG. 8.

FIGS. 7 and 8 are perspective views illustrating pre-operation and post-operation states, respectively, of a vehicle rear-seat position adjustment apparatus according to a second embodiment of the present disclosure. FIG. 9 is a cross-sectional view taken along line A-A on FIG. 7. FIG. 10 is a cross-sectional view taken along line B-B on FIG. 8.

A feature of the vehicle rear-seat position adjustment apparatus according to the second embodiment of the present disclosure is that the positioning of the rear seat 10 may be manually adjusted to provide a fatigue-reducing environment.

To this end, a pair of fixation rails 116 may be mounted on the floor panel 40 in such a manner as to be spaced apart from each other in the leftward-rightward direction, and a movable rail 126 may be fastened to the fixation rail 116 in a manner that is movable backward and forward. Furthermore, the leg frame 110 may be fixedly mounted on the fixation rail 116, and the front end portion of the tilting link 120 may be fastened by a fourth hinge mechanism H4 to the movable rail 126.

As in the vehicle rear-seat position adjustment apparatus according to the first embodiment, the leg frame 110 may have a structure of a vertical plate in which the slot 112 of a predetermined great length in the forward-backward direction is formed. The leg frame 110 may be fixedly mounted on the fixation rail 116, In addition, the front end portion of the tilting link 120 may be connected to the slot 112 in the leg frame 110 in a manner that is movable backward and forward. To this end, the guide pin 122 may be formed on the front end portion of the tilting link 120. The guide pin 122 may be inserted into the slot 112 for being fastened thereto in a manner that is movable backward or forward.

In addition, as in the vehicle rear-seat position adjustment apparatus according to the first embodiment, the seat cushion frame 130, as the internal bone structure of the seat cushion of the rear seat, may be configured to include the first connection pipe 131, the tilting frame 133, and the second connection pipe 132. The first connection pipe 131 may be connected to the front end portions of the leg frames 110 and thus may be arranged along the leftward-rightward direction. The front end portion of the tilting frame 133 may be rotatably connected by the first hinge mechanism H1 to the first connection pipe 131, and the rear end portion thereof may be rotatably connected by the second hinge mechanism H2 to the rear end portion of the tilting link 120. Thus, the tilting frame 133 may be arranged along the forward-backward direction. The second connection pipe 132 may be connected to the rear end portions of the tilting frames 133 and thus may be arranged along the leftward-rightward direction.

In addition, in the vehicle rear-seat position adjustment apparatus according to the second embodiment of the present disclosure, the recliner 104, the latch 14, the striker 34, and the like may be also provided in the same manner as in the above-described vehicle rear-seat position adjustment apparatus according to the first embodiment. The recliner 104 may serve to recline the seat back 12 of the rear seat 10 toward the vehicle rear end. The latch 14 may be mounted on the rear surface of the seat back 12 of the rear seat 10. The striker 34 may be fastened to the latch 14 in a locking-enabled manner.

The vehicle rear-seat position adjustment apparatus according to the second embodiment of the present disclosure includes a manual operation mechanism 150 in a featured manner. The manual operation mechanism 150 may be connected to the movable rail 126 in a locking-enabled manner and thus may move backward and forward the front end portion of the tilting link 120 fastened by the fourth hinge mechanism H4 to the movable rail 126.

Accordingly, with a drive force by the manual operation mechanism 150, the front end portion of the tilting link 120 may move backward along the slot 112 in the leg frame 110. Thus, as in the above-described vehicle rear-seat position adjustment apparatus according to the first embodiment, the operations, such as the operation of vertically raising the tilting link 120 and at the same time causing the rear end portion of the tilting link 120 to push upward the rear end portion of the tilting frame 133 of the seat cushion frame 130, may be consistently performed. Thus, the rear seat 10 may be consistently positioned to provide a fatigue-reducing environment.

To this end, the manual operation mechanism 150 may be configured to include a hinge bracket 152, a clasp 154, and a manual operation bar 156 of a predetermined length. The hinge bracket 152 may be mounted on the movable rail 126. The clasp 154 may be rotatably mounted on the hinge bracket 152 and may be selectively inserted into one of a plurality of locking holes 118, formed in the fixation rail 116, for being locked thereto. The manual operation bar 156 may be connected to the clasp 154 and operates to rotate the clasp 154 in a locking or unlocking direction.

The flow of operation of the vehicle rear-seat position adjustment apparatus according to the second embodiment of the present disclosure is described as follows.

First, when a user rotates the manual operation bar 156 in the unlocking direction, the clasp 154, as illustrated in FIG. 10, slips out of the locking hole 118 in the fixation rail 116.

Subsequently, when the user pushes the manual operation bar 156 backward, the movable rail 126 may move backward along the fixation rail 116, and, at the same time, the front end portion of the tilting link 120 fastened by the fourth hinge mechanism H4 to the movable rail 126 may also move backward together.

Accordingly, as in the described-above vehicle rear-seat position adjustment apparatus according to the first embodiment, when the guide pin 122 on the tilting link 120 is positioned at the rearmost position in the slot 112 in the leg frame 110, the tilting link 120 may be vertically raised and may push upward the rear end portion of the seat cushion frame 130, that is, the rear end portion of the tilting frame 133 of the seat cushion frame 130. Accordingly, the tilting frame 133 may be inclined upward toward the backward direction and thus may be in the state of being arranged along the forward-backward direction.

In this state, the seat back 12 of the rear seat 10 may be reclined toward the vehicle rear end down to the bottom of the luggage room 30, and the seat back 22 of the front seat 20 may be reclined toward the vehicle front end so that the occupant can lean on the seat back 22.

According to the second embodiment of the present disclosure, the occupant can place his/her buttocks and thighs on the seat cushion 11 of the rear seat 10 with his/her back being supported on the seat back 22 of the front seat 20. Furthermore, the occupant can place his/her calves on the seat back 12 of the rear seat 10 in the same manner as if a leg rest were used. In this manner, the rear seat 10 may be positioned to provide a fatigue-reducing environment. Thus, the occupant can feel comfortable and relaxed using fatigue-reducing body posture while viewing the scenery through the tailgate opened or while watching a movie on the screen attached to the vicinity of the tailgate.

In addition, when the occupant sits on the seat cushion 11 of the rear seat 10, the rear end portion of the seat cushion 11 of the rear seat 10 may be in the state of being raised. Thus, the occupant's buttocks may be prevented from being pushed toward the vehicle rear end in a sliding manner. Therefore, the occupant can feel comfortable and relaxed while maintaining fatigue-reducing body posture for taking a rest, viewing the scenery through the tailgate opened, watching a movie on the screen attached to the vicinity of the tailgate, and the like. In this manner, the rear seat 10 can be utilized as a useful convenience for various tailgating activities.

Figure 11:
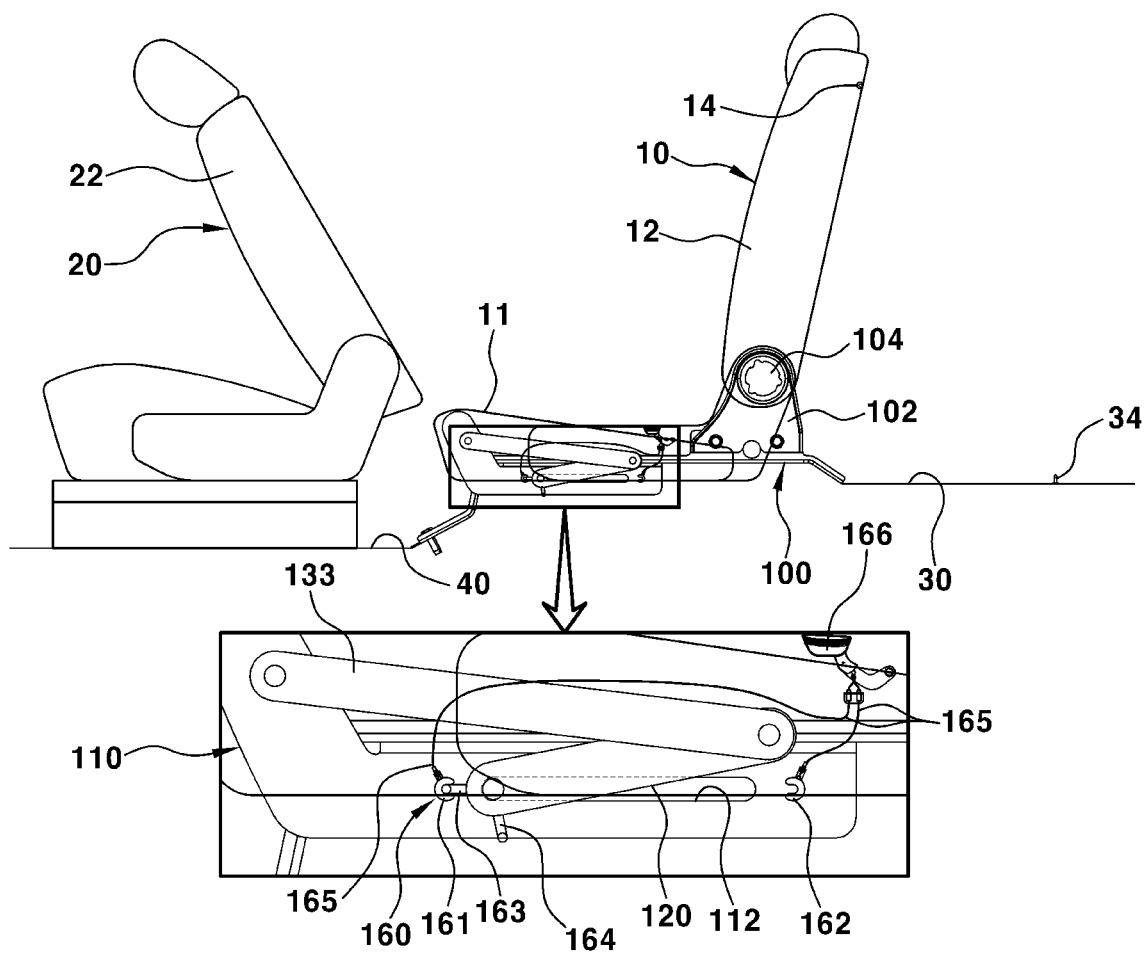
FIGS. 11 and 12 are longitudinal cross-sectional views illustrating pre-operation and post-operation states, respectively, of a vehicle rear-seat position adjustment apparatus according to a third embodiment of the present disclosure.
Figure 12:
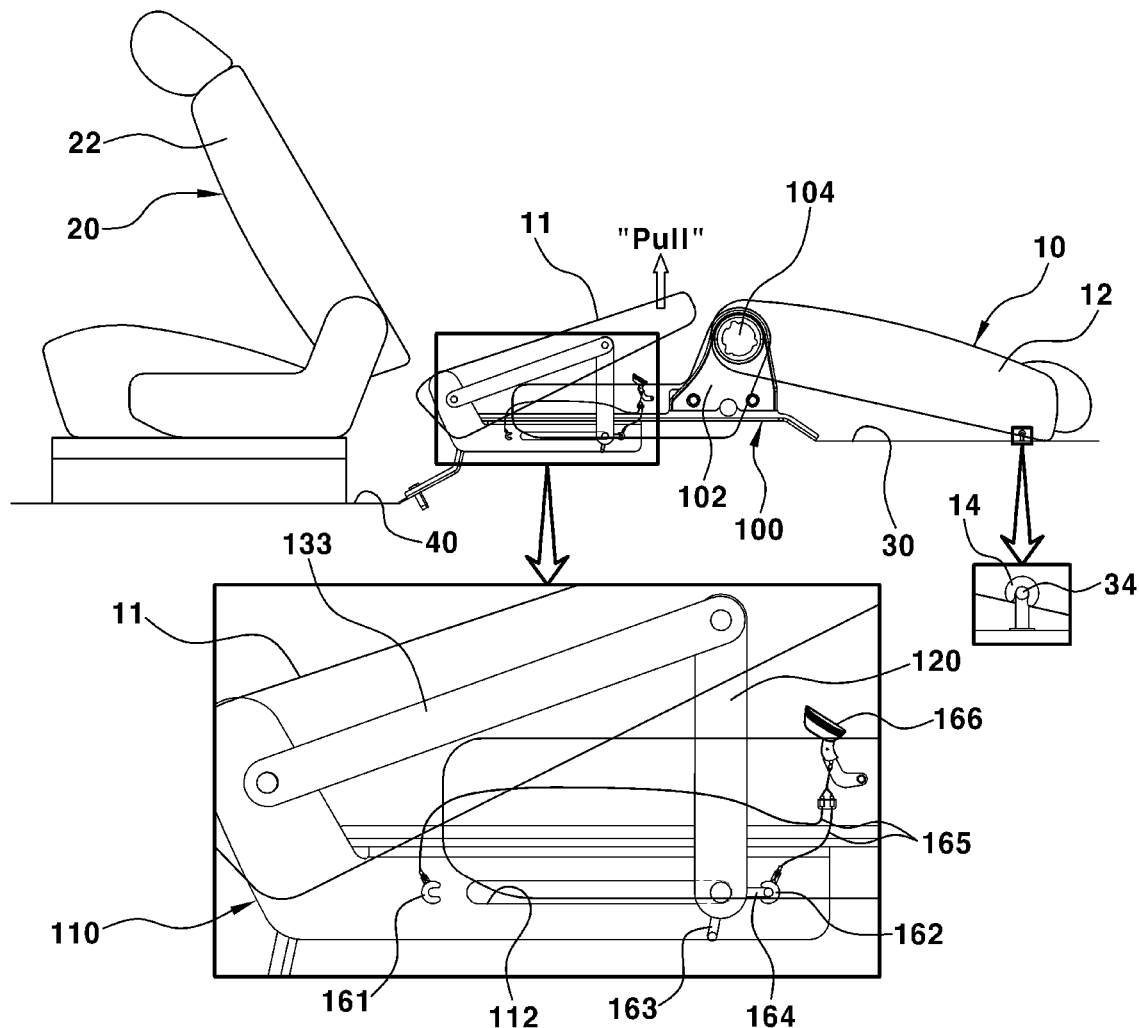

FIGS. 11 and 12 are longitudinal cross-sectional views illustrating pre-operation and post-operation states, respectively, of a vehicle rear-seat position adjustment apparatus according to a third embodiment of the present disclosure.

The vehicle rear-seat position adjustment apparatus according to the third embodiment of the present disclosure is configured in the same manner as the vehicle rear-seat position adjustment apparatus according to the first embodiment of the present disclosure, except that a locking device 160 locking or unlocking the tilting link 120 is provided in a featured manner to manually adjust the positioning of the rear seat for providing a fatigue-reducing environment.

The locking device 160 may be mounted between the leg frame 110 and the tilting link 120. The locking device 160 may be configured in such a manner as to have a structure that fixes the tilting link 120 when the front end portion of the tilting link 120 reaches the frontmost moving point or the rearmost moving point in the slot 112 in the leg frame 110.

To this end, as illustrated in FIGS. 11 and 12, the locking device 160 may include a first latch 161 and a second latch 162. The first latch 161 may be mounted at a position on the front end portion of the leg frame 110, the position adjacent to the frontmost position in the slot 112. The second latch 162 may be mounted at a position on the rear end portion of the leg frame 110, the position adjacent to the rearmost position in the slot 112.

For reference, a well-known latch or the like that is mounted on a vehicle door and is fastened to a striker for being locked thereto may be used as the first latch 161 and the second latch 162. The locking structure of the latch, the operation principle of the latch, and the like are well known, and thus detailed descriptions thereof are omitted.

In addition, as illustrated in FIGS. 11 and 12, the locking device 160 includes a first striker 163 and a second striker 164. The first striker 163 may be mounted on the front end portion of the tilting link 120 and may be fastened to the first latch 161 for being locked thereto when the front end portion of the tilting link 120 reaches the frontmost moving point in the slot 112. The second striker 164 may be mounted on the front end portion of the tilting link 120 and may be fastened to the second latch 162 for being locked thereto when the front end portion of the tilting link 120 reaches the rearmost moving point in the slot 112.

In this case, an unlocking cable 165 that may be connected to each of the first latch 161 and the second latch 162 may be connected to one unlocking lever 166 operable by the user in a manner that is enabled to be pulled together.

Accordingly, when the user pulls the unlocking lever 166 in the unlocking direction, the unlocking cable 165 may be pulled, and, at the same time, the first latch 161 and the second latch 162 may be unlocked.

The flow of operation of the vehicle rear-seat position adjustment apparatus according to the third embodiment of the present disclosure is described as follows.

When the guide pin 122 on the tilting link 120 is positioned at the frontmost position in the slot 112 in the leg frame 110, the tilting link 120 may be inclined upward toward the backward direction and thus may be in the state of being arranged along the forward-backward direction. The tilting frame 133 of the seat cushion frame 130 may be inclined downward toward the backward direction and thus may be in the state of being arranged along the forward-backward direction.

In this state, the first striker 163 mounted on the tilting link 120 may be fastened to the first latch 161 mounted on the front end portion of the leg frame 110 for being locked thereto, and thus the seat cushion 11 of the rear seat 10 may be in a state of being fixed at its original position.

In a state where, as described above, the seat cushion 11 of the rear seat 10 may be arranged at its original position, the tilting operation of pushing the seat back 12 of the rear seat 10 toward the vehicle rear end down to the luggage room 30 and raising the rear end portion of the seat cushion 11 of the rear seat 10 may be performed. Thus, the rear seat 10 may be positioned to provide a comfortable relaxed environment. Thus, the occupant can feel comfortable and relaxed using proper body posture, with the vehicle rear end in his/her line of sight.

To this end, when the user first pulls the unlocking lever 166 in the unlocking direction, the unlocking cable 165 may be pulled, and, at the same time, the first latch 161, and the second latch 162 may be unlocked.

Subsequently, when the user raises the rear end portion of the seat cushion 11 of the rear seat 10 by himself/herself, the guide pin 122 on the tilting link 120 may move backward along the slot 112 in the leg frame 110 and may be positioned at the rearmost position in the slot 112.

In addition, when the guide pin 122 on the tilting link 120 is positioned at the rearmost position in the slot 112 in the leg frame 110, the tilting link 120 may be vertically raised, and the rear end portion of the seat cushion frame 130, that is, the rear end portion of the tilting frame 133 of the seat cushion frame 130 may be pushed upward. Accordingly, the tilting frame 133 may be inclined upward toward the backward direction and thus may be in the state of being arranged along the forward-backward direction.

In this state, when the user releases the unlocking lever 166, the second striker 164 mounted on the tilting link 120 may be fastened to the second latch 162 mounted on the rear end portion of the leg frame 110 for being locked thereto. Thus, the seat cushion 11 of the rear seat 10 may be inclined upward toward the backward direction and thus may be kept fixed.

In addition, when the seat back 12 of the rear seat 10 is reclined toward the vehicle rear end down to the bottom of the luggage room 30, the striker 34 may be fastened to the latch 14 for being locked thereto. Thus, the seat back 12 may be kept fixed.

In this case, the seat back 22 of the front seat 20 may be reclined toward the vehicle front end in such a manner that the occupant can lean on the seat back 22.

Therefore, as illustrated in FIG. 12, the occupant can place his/her buttocks and thighs on the seat cushion 11 of the rear seat 10 with his/her back being supported on the seat back 22 of the front seat 20. Furthermore, the occupant can place his/her calves on the seat back 12 of the rear seat 10 in the same manner as if a leg rest were used. In this manner, the rear seat may be positioned to provide a fatigue-reducing environment. Thus, the occupant can feel comfortable and relaxed using fatigue-reducing body posture while viewing the scenery through the tailgate opened or while watching a movie on the screen attached to the vicinity of the tailgate.

Particularly, when the occupant sits on the seat cushion 11 of the rear seat 10, the rear end portion of the seat cushion 11 of the rear seat 10 may be in the state of being raised. Thus, the occupant's buttocks may be prevented from being pushed toward the vehicle rear end in a sliding manner. Therefore, the occupant can feel comfortable and relaxed while maintaining proper body posture for taking a rest, viewing the scenery through the tailgate opened, watching a movie on the screen attached to the vicinity of the tailgate, and the like. In this manner, the rear seat 10 can be utilized as a useful convenience for various tailgating activities.

The embodiments of the present disclosure that are described in detail above do not impose any limitation on the claimed scope of the present disclosure. Various modifications and improvements that a person of ordinary skill in the art makes using the subject matter of the present disclosure that is defined in the following claims will also be included in the claimed scope of the present disclosure.

What is claimed is:

1. A vehicle rear-seat position adjustment apparatus comprising:
   a pair of support frames mounted on a floor panel in such a manner as to be spaced apart from each other in a leftward-rightward direction;
   a leg frame having a structure in which a slot of a predetermined length is formed and fixedly mounted on the support frame;
   a tilting link of which a front end portion is connected to the slot in the leg frame in a manner that is movable backward and forward;
   a seat cushion frame of which a front end portion is connected by a first hinge mechanism to the leg frame and of which a rear end portion is connected by a second hinge mechanism to a rear end portion of the tilting link;
   a recliner mounted on a side frame connected to a rear end portion of the support frame in order to recline a seat back of a rear seat; and
   a drive device connected to the front end portion of the tilting link and configured to move the tilting link backward and forward along the slot.

2. The vehicle rear-seat position adjustment apparatus of claim 1, wherein a guide pin inserted into the slot for being fastened thereto in a manner that is movable backward or forward is formed on the front end portion of the tilting link.

3. The vehicle rear-seat position adjustment apparatus of claim 1, wherein the seat cushion frame as covered by a seat cushion of the rear seat comprises:
   a first connection pipe connected to front end portions of the leg frames and thus arranged along the leftward-rightward direction;
   a tilting frame of which a front end portion is connected by the first hinge mechanism H1 to the first connection pipe and of which a rear end portion is connected by the second hinge mechanism H2 to the rear end portion of the tilting link, the tilting frame thus being arranged along a forward-backward direction; and
   a second connection pipe connected to the rear end portion of the tilting frame and thus arranged along the leftward-rightward direction.

4. The vehicle rear-seat position adjustment apparatus of claim 1, wherein with a drive force by the drive device, the front end portion of the tilting link moves backward along the slot, and thus an operation of vertically raising the tilting link and at the same time causing the rear end portion of the tilting link to push upward the rear end portion of the seat cushion frame is performed.

5. The vehicle rear-seat position adjustment apparatus of claim 1, wherein the drive device comprises:
   a motor mounted on the seat cushion frame;
   a decelerator connected to an output shaft of the motor;
   a lead screw of which a first end portion is connected to an output shaft of the decelerator and of which a second end portion is connected to a bracket mounted on a rear end portion of the leg frame in a manner that is rotatable in a stationary position; and a slider combined by a nut and bolt mechanism to the lead screw and connected to the front end portion of the tilting link, the slider thus moving backward or forward when the lead screw rotates in the stationary position.

6. The vehicle rear-seat position adjustment apparatus of claim 1, wherein the drive device comprises:

an electrically powered cylinder or a hydraulic pressure cylinder that is mounted on the leg frame; and a piston rod mounted on the electrically powered cylinder or the hydraulic pressure cylinder in a manner that is movable backward and forward and thus connected by a third hinge mechanism to the front end portion of the tilting link.

7. The vehicle rear-seat position adjustment apparatus of claim 1, wherein a latch is mounted on a rear surface of the seat back of the rear seat, and a striker fastened to the latch in a lockable manner is mounted on a bottom of a luggage room.

8. A vehicle rear-seat position adjustment apparatus comprising:

a pair of fixed rails mounted on a floor panel in such a manner as to be spaced apart from each other in a leftward-rightward direction;

a movable rail fastened to the fixation rail in a manner that is movable backward and forward;

a leg frame having a structure in which a slot of a predetermined length is formed and fixedly mounted on the fixation rail;

a tilting link of which a front end portion is connected to the slot in the leg frame in a manner that is movable backward and forward, and is connected by a fourth hinge mechanism to the movable rail;

a seat cushion frame of which a front end portion is connected by a first hinge mechanism to the leg frame and of which a rear end portion is connected by a second hinge mechanism to a rear end portion of the tilting link;

a recliner mounted on a side frame in order to recline a seat back of a rear seat; and a manual operation mechanism connected to the movable rail in a lockable manner and configured to move backward and forward the front end portion of the tilting link fastened by the fourth hinge mechanism to the movable rail.

9. The vehicle rear-seat position adjustment apparatus of claim 8, wherein a guide pin inserted into the slot for being fastened thereto in a manner that is movable backward or forward is formed on the front end portion of the tilting link.

10. The vehicle rear-seat position adjustment apparatus of claim 8, wherein the seat cushion frame as covered by a seat cushion of the rear seat comprises:

a first connection pipe connected to front end portions of the leg frames and thus arranged along the leftward-rightward direction;

a tilting frame of which a front end portion is connected by the first hinge mechanism to the first connection pipe and of which a rear end portion is connected by the second hinge mechanism to the rear end portion of the tilting link, the tilting frame thus being arranged along a forward-backward direction; and a second connection pipe connected to the rear end portions of the tilting frames and thus arranged along the leftward-rightward direction.

11. The vehicle rear-seat position adjustment apparatus of claim 8, wherein with a drive force by the manual operation mechanism, the front end portion of the tilting link moves backward along the slot, and thus an operation of vertically raising the tilting link and at the same time causing the rear end portion of the tilting link to push upward the rear end portion of the seat cushion frame is performed.

12. The vehicle rear-seat position adjustment apparatus of claim 8, wherein the manual operation mechanism comprises:

a hinge bracket mounted on the movable rail;

a clasp rotatably mounted on the hinge bracket and selectively inserted into one of a plurality of locking holes, formed in the fixation rail, for being locked thereto; and a manual operation bar of a predetermined length connected to the clasp and operating to rotate the clasp in a locking or unlocking direction.

13. The vehicle rear-seat position adjustment apparatus of claim 8, wherein a latch is mounted on a rear surface of the seat back of the rear seat, and a striker fastened to the latch in a lockable manner is mounted on a bottom of a luggage room.

14. A vehicle rear-seat position adjustment apparatus comprising:

a pair of support frames mounted on a floor panel in such a manner as to be spaced apart from each other in a leftward-rightward direction;

a leg frame having a structure in which a slot of a predetermined length is formed and fixedly mounted on the support frame;

a tilting link of which a front end portion is connected to the slot in the leg frame in a manner that is movable backward and forward;

a seat cushion frame of which a front end portion is connected by a first hinge mechanism to the leg frame and of which a rear end portion is connected by a second hinge mechanism to a rear end portion of the tilting link;

a recliner mounted on a side frame connected to a rear end portion of the support frame in order to recline a seat back of a rear seat; and a locking device mounted between the leg frame and the tilting link and configured to fix the tilting link when the front end portion of the tilting link reaches the frontmost moving point or the rearmost moving point in the slot.

15. The vehicle rear-seat position adjustment apparatus of claim 14, wherein a guide pin inserted into the slot for being fastened thereto in a manner that is movable backward or forward is formed on the front end portion of the tilting link.

16. The vehicle rear-seat position adjustment apparatus of claim 14, wherein the seat cushion frame as covered by a seat cushion of the rear seat comprises:

a first connection pipe connected to front end portions of the leg frames and thus arranged along the leftward-rightward direction;

a tilting frame of which a front end portion is connected by the first hinge mechanism to the first connection pipe and of which a rear end portion is connected by the second hinge mechanism to the rear end portion of the tilting link, the tilting frame thus being arranged along a forward-backward direction; and a second connection pipe connected to the rear end portions of the tilting frames and thus arranged along the leftward-rightward direction.

17. The vehicle rear-seat position adjustment apparatus of claim 14, wherein the locking device comprises:

a first latch mounted on a front end portion of the leg frame;

a second latch mounted on a rear end portion of the leg frame;

a first striker mounted on a front end portion of the tilting link and fastened to the first latch for being locked thereto when the front end portion of the tilting link reaches the frontmost moving point in the slot; and a second striker mounted on the front end portion of the tilting link and fastened to the second latch for being locked thereto when the front end portion of the tilting link reaches the rearmost moving point in the slot.

18. The vehicle rear-seat position adjustment apparatus of claim 17, wherein an unlocking cable connected to each of the first latch, and the second latch is connected to one unlocking lever in a manner that is enabled to be pulled together.

19. The vehicle rear-seat position adjustment apparatus of claim 14, wherein a latch is mounted on a rear surface of the seat back of the rear seat, and a striker fastened to the latch in a lockable manner is mounted on a bottom of a luggage room.

\* \* \* \* \*